US012656570B2

(12) United States Patent
Choi et al.

(10) Patent No.: US 12,656,570 B2
(45) Date of Patent: Jun. 16, 2026

(54) LENS MODULE AND WEARABLE DEVICE INCLUDING THE SAME

(71) Applicant: SAMSUNG ELECTRO-MECHANICS CO., LTD., Suwon-si (KR)

(72) Inventors: Seong Jin Choi, Suwon-si (KR); Young Suk Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 311 days.

(21) Appl. No.: 18/492,217

(22) Filed: Oct. 23, 2023

(65) Prior Publication Data

US 2024/0231032 A1 Jul. 11, 2024

(30) Foreign Application Priority Data

Jan. 9, 2023 (KR) ........................ 10-2023-0003025

(51) Int. Cl.
*G02B 7/02* (2021.01)
*G02B 7/09* (2021.01)
*G02B 27/01* (2006.01)

(52) U.S. Cl.
CPC ............. *G02B 7/021* (2013.01); *G02B 7/026* (2013.01); *G02B 7/09* (2013.01); *G02B 27/0176* (2013.01)

(58) Field of Classification Search
None
See application file for complete search history.

(56) References Cited

U.S. PATENT DOCUMENTS

| | | | |
|---|---|---|---|
| 5,583,595 A * | 12/1996 | Hara ...................... | G02B 7/102 396/85 |
| 10,234,674 B2 | 3/2019 | McCreight, Jr. | |
| 2005/0104995 A1* | 5/2005 | Spryshak ............... | G02B 7/026 348/360 |
| 2007/0297070 A1* | 12/2007 | Shimizu ............... | G03B 21/142 359/701 |

(Continued)

FOREIGN PATENT DOCUMENTS

| | | |
|---|---|---|
| CN | 102298190 A | 12/2011 |
| CN | 106526730 A | 3/2017 |

(Continued)

OTHER PUBLICATIONS

Taiwanese Office Action Issued on Sep. 4, 2024, in Counterpart Taiwanese Patent Application No. 112141612 (5 Pages in English, 5 Pages in Chinese).

(Continued)

*Primary Examiner* — Shan Liu
(74) *Attorney, Agent, or Firm* — NSIP Law

(57) ABSTRACT

A lens module is provided. The lens module includes a movable barrel configured to accommodate a plurality of lenses, a fixed barrel configured to accommodate the movable barrel, and a zoom ring configured to accommodate the fixed barrel and including at least one diopter groove on an inner circumferential surface thereof, wherein the diopter groove may include an inclined section that connects two points having different positions in an optical axis direction and respective extension sections which curvedly extend from a first end of the inclined section and a second end of the inclined section.

17 Claims, 8 Drawing Sheets

(56)          References Cited

U.S. PATENT DOCUMENTS

| | | | | |
|---|---|---|---|---|
| 2011/0026143 A1 * | 2/2011 | Katano | .................... | G02B 7/08 |
| | | | | 359/817 |
| 2016/0306136 A1 | 10/2016 | Hu | | |
| 2019/0377236 A1 | 12/2019 | Jang et al. | | |
| 2020/0192080 A1 | 6/2020 | Karam | | |
| 2020/0371360 A1 | 11/2020 | Dalrymple et al. | | |
| 2021/0048563 A1 | 2/2021 | Kim | | |
| 2022/0113490 A1 * | 4/2022 | Liu | ......................... | G02B 7/04 |
| 2022/0413250 A1 | 12/2022 | Zhou et al. | | |
| 2024/0272439 A1 * | 8/2024 | Jiang | ..................... | G02B 7/022 |

FOREIGN PATENT DOCUMENTS

| | | | | | |
|---|---|---|---|---|---|
| CN | 110764267 A | 2/2020 | | | |
| CN | 111699669 A | 9/2020 | | | |
| CN | 114270228 A | 4/2022 | | | |
| JP | 5-307137 A | 11/1993 | | | |
| JP | 2016-539376 A | 12/2016 | | | |
| JP | 7027451 B2 | 3/2022 | | | |
| KR | 10-0389718 B1 | 6/2003 | | | |
| KR | 10-2013-0141294 A | 12/2013 | | | |
| KR | 20130141294 A | * 12/2013 | ............. | G02B 7/023 |
| TW | 201913146 A | 4/2019 | | | |

OTHER PUBLICATIONS

Korean Office Action issued on Jan. 6, 2025 in corresponding Korean Patent Application No. 10-2023-0003025. (5 pages in English and 5 pages in Korean).

* cited by examiner

100

I-I'

1000

1200

1100

LENS MODULE AND WEARABLE DEVICE INCLUDING THE SAME

CROSS-REFERENCE TO RELATED APPLICATIONS

This application claims the benefit under 35 USC § 119(a) of Korean Patent Application No. 10-2023-0003025 filed on Jan. 9, 2023, in the Korean Intellectual Property Office, the entire disclosure of which is incorporated herein by reference for all purposes.

BACKGROUND

1. Field

The following description relates to a lens module.

2. Description of Related Art

Recently, the implementation of virtual reality (VR) and augmented reality (AR) devices has grown rapidly.

In the field of VR and AR, the miniaturization and light weight of the devices have been considered very important factors, and in order to meet the demand therefor, many products are equipped with pancake-type lenses. Pancake-type lenses are lenses that dramatically reduce a focal length of optical systems, thereby maintaining a wide viewing angle, although having thinner form factor.

Lens modules go through a process of diopter performance inspection before being mounted on products. However, it may be difficult to fix the position of the lenses in the structure of the typical lens modules, and there is a limit to obtaining accurate performance test results.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a lens module includes a movable barrel configured to accommodate a plurality of lenses; a fixed barrel configured to accommodate the movable barrel; and a zoom ring configured to accommodate the fixed barrel, and comprising at least one diopter groove on an inner circumferential surface thereof, wherein the diopter groove includes: an inclined section that connects two points having different positions in an optical axis direction; and respective extension sections which curvedly extend from a first end of the inclined section and a second end of the inclined section.

The extension sections may be formed to have a constant position in the optical axis direction, and may include: a first extension section formed in a first position in the optical axis direction; and a second extension section formed in a second position in the optical axis direction, and the inclined section connects a first end of the first extension section to a first end of the second extension section.

The first position may be below the second position in the optical axis direction, and the first extension section may be formed to have a length that is greater than a length of the second extension section.

The zoom ring may further include a vertical section that is formed to have a length in the optical axis direction on an inner circumferential surface thereof, and the vertical section may be connected to the first extension section.

The movable barrel may include a coupling protrusion on an outer circumferential surface thereof, the fixed barrel may include an avoidance groove in a portion corresponding to the coupling protrusion, and the coupling protrusion directly faces the inner circumferential surface of the zoom ring through the avoidance groove, and is inserted into the diopter groove.

The diopter groove may be provided in plural, and the coupling protrusion may be provided in a number corresponding to the plural diopter grooves.

The avoidance groove may have a length in the optical axis direction, and one side of the avoidance groove is open in the optical axis direction.

The zoom ring and the movable barrel may be configured to move, relative to the fixed barrel, the zoom ring may be configured to rotate with respect to the fixed barrel based on the optical axis as a rotation axis, and the movable barrel may be configured to move in the optical axis direction with respect to the fixed barrel as the zoom ring rotates.

The fixed barrel may include a guide groove on an outer circumferential surface thereof, and a fixing pin, that mutually couples the zoom ring and the fixed barrel, is inserted into the guide groove.

The guide groove may be formed to have a length that is shorter than a length of the inclined section.

The lens module may include a deco cap that covers a portion of an open upper portion of the movable barrel.

The lens module may include an O-ring disposed between the movable barrel and the fixed barrel.

An electronic device may include the lens module.

In a general aspect, a wearable device includes a lens module, where the lens module includes a movable barrel configured to accommodate a plurality of lenses; a fixed barrel configured to accommodate the movable barrel; and a zoom ring configured to accommodate the fixed barrel and comprising at least one diopter groove on an inner circumferential surface thereof, wherein the diopter groove includes an inclined section that connects two points having different positions in an optical axis direction; and respective extension sections which curvedly extend from a first end of the inclined section and a second end of the inclined section.

The extension sections may be formed to have a constant position in the optical axis direction and may include a first extension section formed in a first position in the optical axis direction; and a second extension section formed in a second position in the optical axis direction, and the inclined section connects a first end of the first extension section to a first end of the second extension section.

In a general aspect, a lens module includes a lens barrel, comprising a fixed barrel and a movable barrel disposed in the fixed barrel, where the movable barrel s configured to move in an optical axis direction relative to the fixed barrel; a zoom ring, comprising a plurality of adjustment grooves, each of the plurality of adjustment grooves including a first extension section; a second extension section, and an inclined section that connects the first extension section and the second extension section, wherein the first extension section is spaced apart from the second extension section by a predetermined distance in the optical axis direction, and wherein in a view parallel to the optical axis direction the first extension section and the second extension section extend linearly.

The plurality of adjustment grooves may be configured to guide the movable barrel in the optical axis direction.

The movable barrel may be configured to move between the first extension section and the second extension section.

An electronic device may include the lens module.

Other features and examples will be apparent from the following detailed description, the drawings, and the claims.

Figure 1:
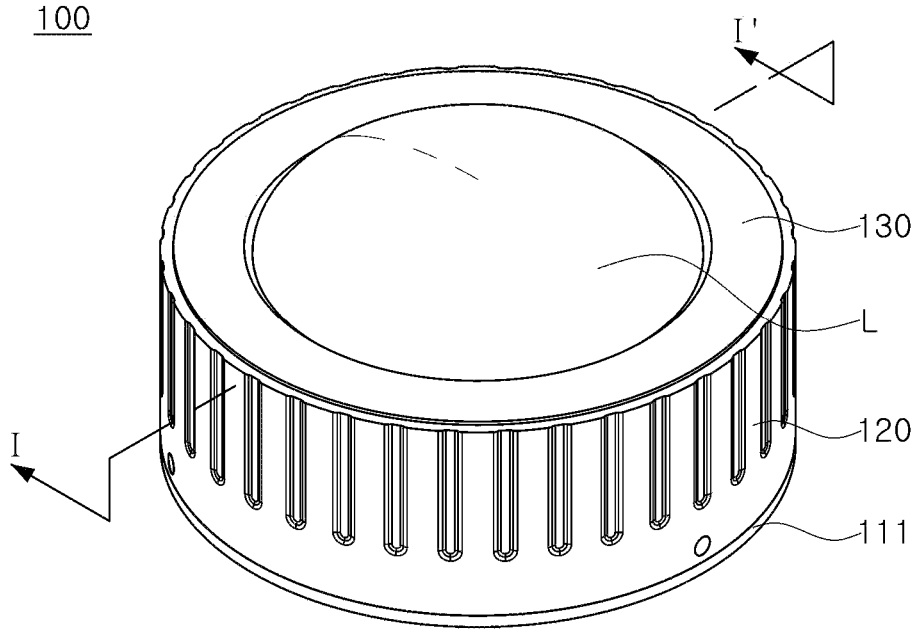
FIG. 1 illustrates a perspective view of an example lens module, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

One or more examples provide a lens module with improved diopter performance and a wearable device including the same.

The one or more examples provide to an example lens module 100, in accordance with one or more embodiments, the example lens module 100 may include a pancake-type lens and, I a non-limited example, may be mounted on a VR wearable device.

The overall structure of the example lens module 100, in accordance with one or more embodiments, will be described with reference to FIGS. 1 and 2.

Figure 2:
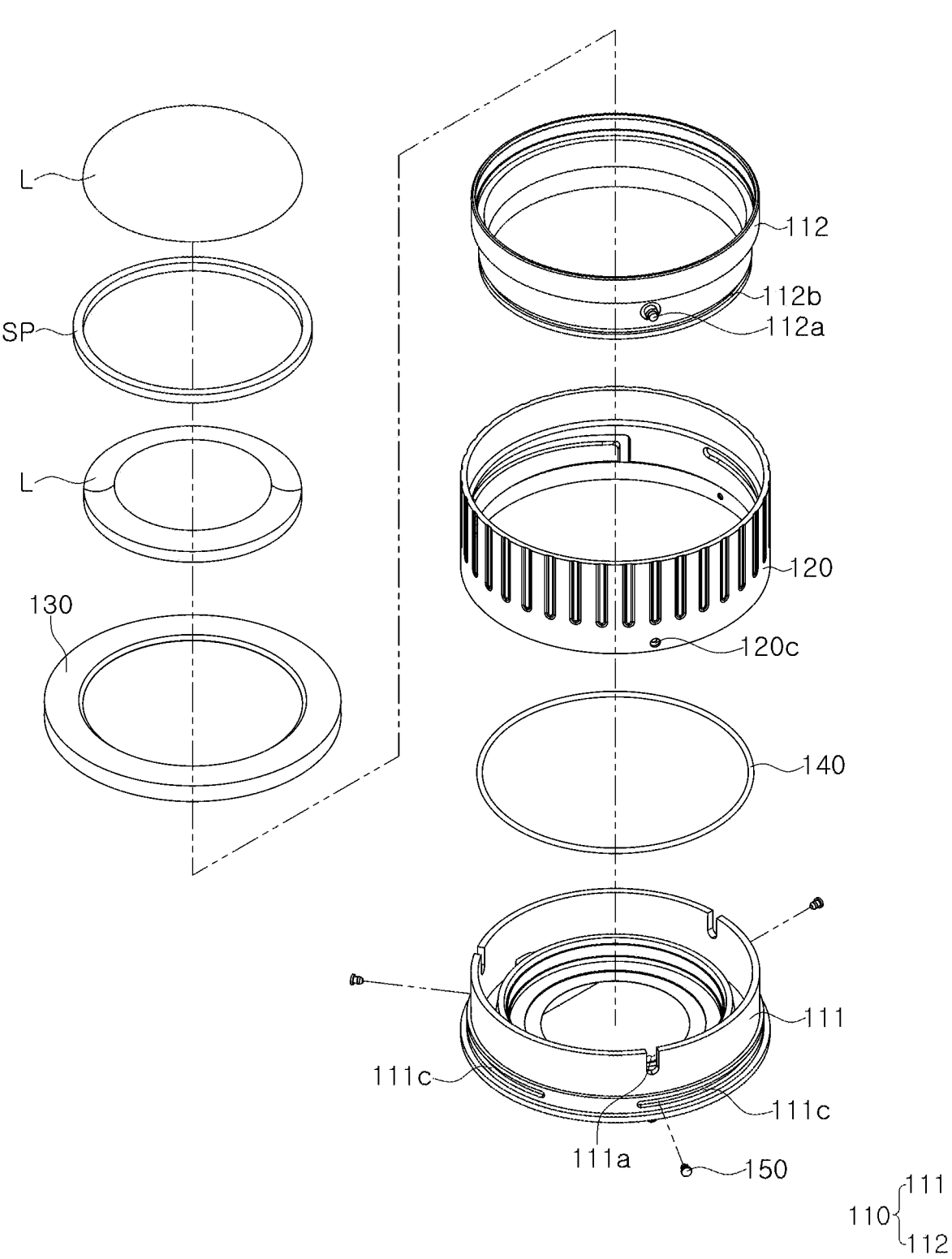
FIG. 2 illustrates an exploded perspective view of an example lens module, in accordance with one or more embodiments.
Figure 3:
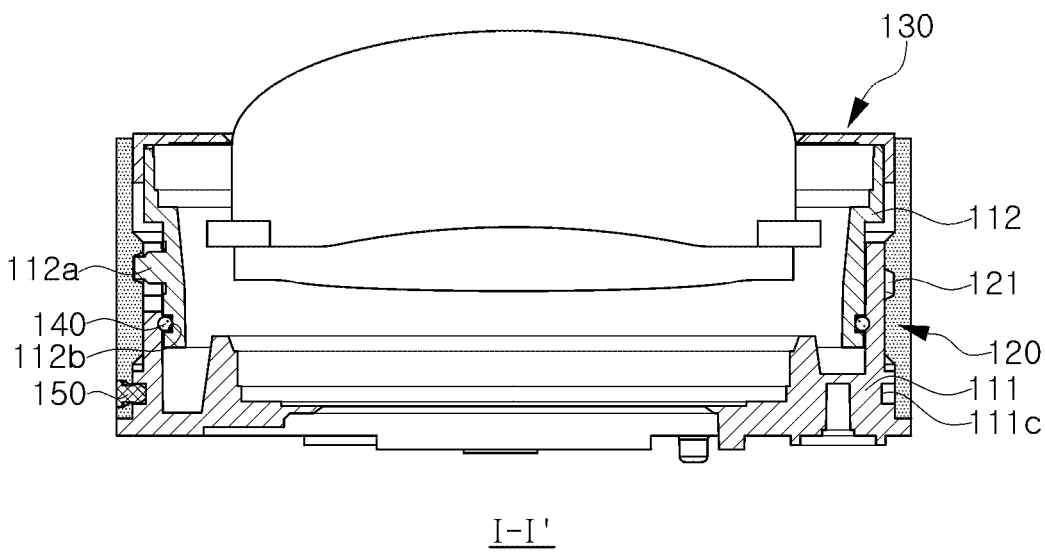
FIG. 3 illustrates a cross-sectional view taken along line I-I' of FIG. 1.

FIG. 1 illustrates a perspective view of an example lens module, in accordance with one or more embodiments, FIG. 2 illustrates an exploded perspective view of an example lens module, in accordance with one or more embodiments, and FIG. 3 illustrates a cross-sectional view taken along line I-I' of FIG. 1.

Referring to FIGS. 1 to 3, the example lens module 100 may include a lens barrel 110 (111 and 112), a zoom ring 120, and a deco cap 130, and may include a plurality of lenses L provided in an internal space (hereinafter, referred to as a hollow) formed thereby.

The lens barrel 110, the zoom ring 120, and the deco cap 130 may include a hollow portion, and the plurality of lenses L may be disposed in the hollow portion in an optical axis (a Z-axis) direction.

In an example, the plurality of lenses L may be single vision lenses, and preferably may be pancake-type lenses that drastically reduce a focal length. The lenses illustrated in the drawing are only for indicating that the lenses exist in a corresponding space, and the number and shape of the lenses are not limited to the number and shape of the lenses illustrated in the drawing.

The plurality of lenses L may be arranged at predetermined intervals along an optical axis (the Z-axis). In this example, a spacer SP may be disposed between adjacent lenses L to maintain a preset distance between the lenses. In a non-limited example, the spacer SP may have a ring shape.

The lens barrel 110 may be classified as a fixed barrel 111 and a movable barrel 112. The fixed barrel 111 may be a fixed member that does not move during zoom driving, and the movable barrel 112 may be a movable member that moves during zoom driving. Specifically, in an example, the movable barrel 112 may move in the optical axis (the Z-axis) direction during zoom driving.

Referring to FIG. 3, the movable barrel 112 (or a portion of the movable barrel 112) may be accommodated in the fixed barrel 111, and the plurality of lenses L and the spacer may be accommodated in the movable barrel 112. Additionally, as illustrated in FIG. 3, since the movable barrel 112 may have an open bottom, a press-fit ring, (not shown) that fixes the plurality of lenses L accommodated in the movable barrel 112, may also be accommodated in the fixed barrel 111. The press-fit ring may be press-fit to a lower portion of the movable barrel 112.

In an example, an O-ring 140 may be disposed between the fixed barrel 111 and the movable barrel 112. In an example, the O-ring 140 may be formed of a material, such as, but not limited to, rubber or silicon. However, the material that the O-ring 140 is formed of is not limited thereto.

The movable barrel 112 may include a groove 112b that is formed along an outer circumferential surface thereof, and the O-ring 140 may be fitted into the groove 112b. In this example, a minute gap between the fixed barrel 111 and the movable barrel 112 may be sealed as the O-ring 140 is fitted into the groove 112b of the movable barrel 112.

Additionally, the movable barrel 112 may include a plurality of coupling protrusions 112a disposed on an outer circumferential surface of the movable barrel 112. The coupling protrusions 112a may be accommodated in a diopter adjustment groove (or an adjustment groove) 121 of the zoom ring 120. A detailed description of this will be given below.

The zoom ring 120 may be disposed outside the fixed barrel 111. The fixed barrel 111 (or portion of the fixed barrel 111) may be accommodated in the zoom ring 120.

The fixed barrel 111 may include a plurality of guide grooves 111c disposed on an outer circumferential surface thereof. Each guide groove 111c may have a length along the outer circumferential surface of the fixed barrel 111. For example, the guide groove 111c may have a length shorter than a length of the diopter groove 121 to be described below, and more specifically, may be shorter than a length of an inclined section 121a of the diopter groove 121.

A fixing pin 150 in the form of a protrusion may be inserted into each guide groove 111c. In an example, the zoom ring 120 may include an insertion hole 120c in a position facing each of the plurality of guide grooves 111c, and the fixing pin 150 may be inserted into the guide groove 111c through the insertion hole 120c. Accordingly, by inserting the fixing pin 150 into the guide groove 111c of the fixed barrel 111, the fixed barrel 111 and the zoom ring 120 may be coupled to each other. Furthermore, the fixing pin 150 may move along the guide groove 111c during zoom driving operations (or a diopter adjustment), thereby assisting a smooth movement of the zoom ring 120.

In an example, the fixed barrel 111 may include a plurality of avoidance grooves 111a, and the coupling protrusions 112a of the movable barrel 112 may be disposed in the avoidance grooves 111a. A detailed description of this will be given below.

The zoom ring 120 may extend in the optical axis (the Z-axis) direction, and may be disposed outside the fixed barrel 111 to form the exterior surface of the lens module 100.

The zoom ring 120 may include a plurality of diopter grooves 121 on an inner circumferential surface thereof.

Each diopter groove 121 may have a length along the inner circumferential surface of the zoom ring 120. Additionally, the coupling protrusion 112a of the movable barrel 112 may be inserted into each respective diopter groove 121.

In an example, the zoom ring 120 may include a plurality of insertion holes 120c as described above.

In an example, as illustrated in FIG. 2, a deco cap 130 may be sandwiched between the movable barrel 112 and the zoom ring 120 to cover a portion of the open upper portion of the movable barrel 112. The deco cap 130 may be disposed to be in contact with a first lens L1 (a lens disposed to be adjacent to a display of a wearable device), among the plurality of lenses L, thereby providing the plurality of lenses L accommodated in the movable barrel 112.

Next, components related to diopter adjustment of the example lens module 100, in accordance with one or more embodiments, will be described in more detail with reference to FIGS. 4 to 7.

Figure 4:
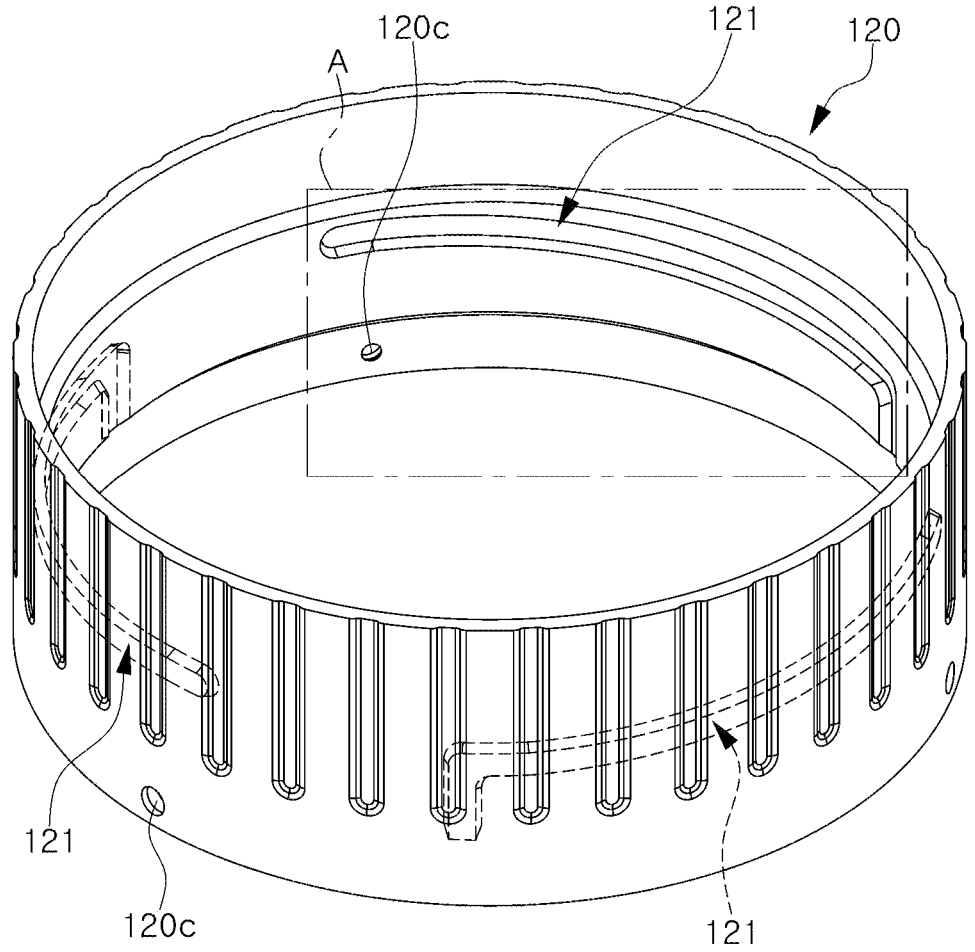
FIG. 4 illustrates a perspective view of an example lens barrel, in accordance with one or more embodiments.
Figure 5:
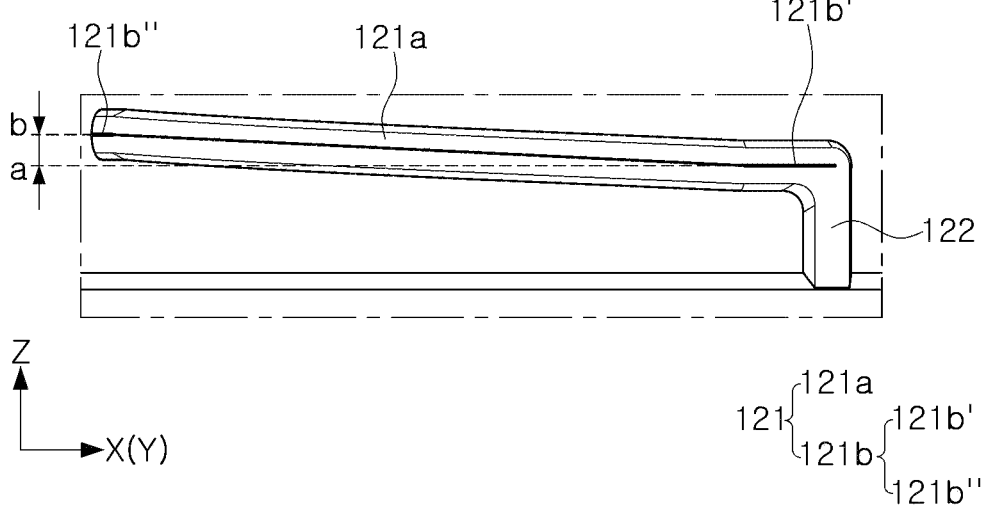
FIG. 5 is a view illustrating a diopter adjustment groove, in accordance with one or more embodiments.

FIG. 4 illustrates a perspective view of an example lens barrel, in accordance with one or more embodiments, and FIG. 5 is a view illustrating a diopter groove, in accordance with one or more embodiments.

Referring to FIG. 4, the zoom ring 120 may include a plurality of diopter grooves 121 having lengths along the inner circumferential surface thereof. The shape of the diopter groove 121 may be identified in detail through FIG. 5.

Referring to FIG. 5, the diopter groove 121 may include an inclined section 121a and extension sections 121b each curvedly extending from both ends of the inclined section 121a.

The inclined section 121a may be a section in which the position in the optical axis (the Z-axis) direction changes, and the extension section 121b may be a section in which the position in the optical axis (the Z-axis) direction is constant. In other words, the inclined section 121a may be a section for changing diopter values of the plurality of lenses L (or a section in which the diopter values of the plurality of lenses L are changed), and the extension section 121b may be a section in which the positions of the plurality of lenses L are fixed to specific diopter value. Accordingly, the extension section 121b may affect the reliability of lens performance test results.

The coupling protrusion 112a of the movable barrel 112 may be inserted into the diopter groove 121. That is, as the coupling protrusion 112a of the movable barrel 112 is inserted into the diopter groove 121, the movable barrel 112 and the zoom ring 120 may be coupled to each other. Accordingly, the movable barrel 112 and the plurality of lenses L accommodated in the movable barrel 112 may move in the optical axis (the Z-axis) direction when the zoom ring 120 rotates.

As the zoom ring 120 rotates, the coupling protrusion 112a may be located in the inclined section 121a or the extension section 121b of the diopter groove 121. In particular, during the lens performance test, the coupling protrusion 112a may be located in the extension section 121b, and thus, since the lens performance test may be performed with the diopter value fixed, the reliability of test results may increase.

Additionally, as described above, since the extension sections 121b may extend from both ends of the inclined section 121a, a position of the extension section 121b' (hereinafter referred to as a first extension section) extending from one end of the inclined section 121a in the optical axis (the Z-axis) direction and a position of the extension section 121b" (hereinafter referred to as a second extension section)

extending from the other end of the inclined section 121a in the optical axis (the Z-axis) direction may be different from each other.

In an example, the first extension section 121b' may be formed in a first position "a" in the optical axis (the Z-axis) direction, and the second extension section 121b" may be formed in a second position "b" in the optical axis (the Z-axis) direction, and in this example, a distance (|a−b|) between the first position "a" and the second position "b" may be a displacement distance of the movable barrel 112 according to a zoom driving operation.

In an example the first extension section 121b' and the second extension section 121b" may be linear extension portions that may be disposed substantially parallel to each other, and the inclined section 121a connects the first extension section 121b' and the second extension section 121b".

Since the positions of the first extension section 121b' and the second extension section 121b" in the optical axis (Z-axis) direction may be different, when the coupling protrusion 112a is located in each extension section, a plurality of the lenses L may have different diopter values. Therefore, the lens performance test may be performed separately in an example in which the coupling protrusion 112a is located in the first extension section 121b', and in an example in which the coupling protrusion 112a is located in the second extension section 121b", and thus, the performance for the diopter values at both ends may be achieved.

The first extension section 121b' and the second extension section 121b" may be formed to be at least longer than a diameter of the coupling protrusion 112a so that the coupling protrusion 112a may be fixed in each section. Furthermore, the first extension section 121b' may include a section for assembly, and thus, the first extension section 121b' may be formed to be longer than the second extension section 121b". The section for assembly of the first extension section 121b' may be connected to a vertical section 122 formed to have a length in the optical axis (Z-axis) direction, and the vertical section 122 may be connected to the diopter groove 121. However, this is limited to an example in which the first position "a" in which the first extension section 121b' is formed is located below the second position "b" in which the second extension section 121b" is formed based on the optical axis (Z-axis) direction. In the opposite example, the description of the first extension section 121b' described above may be applied to the second extension section 121b".

Figure 6:
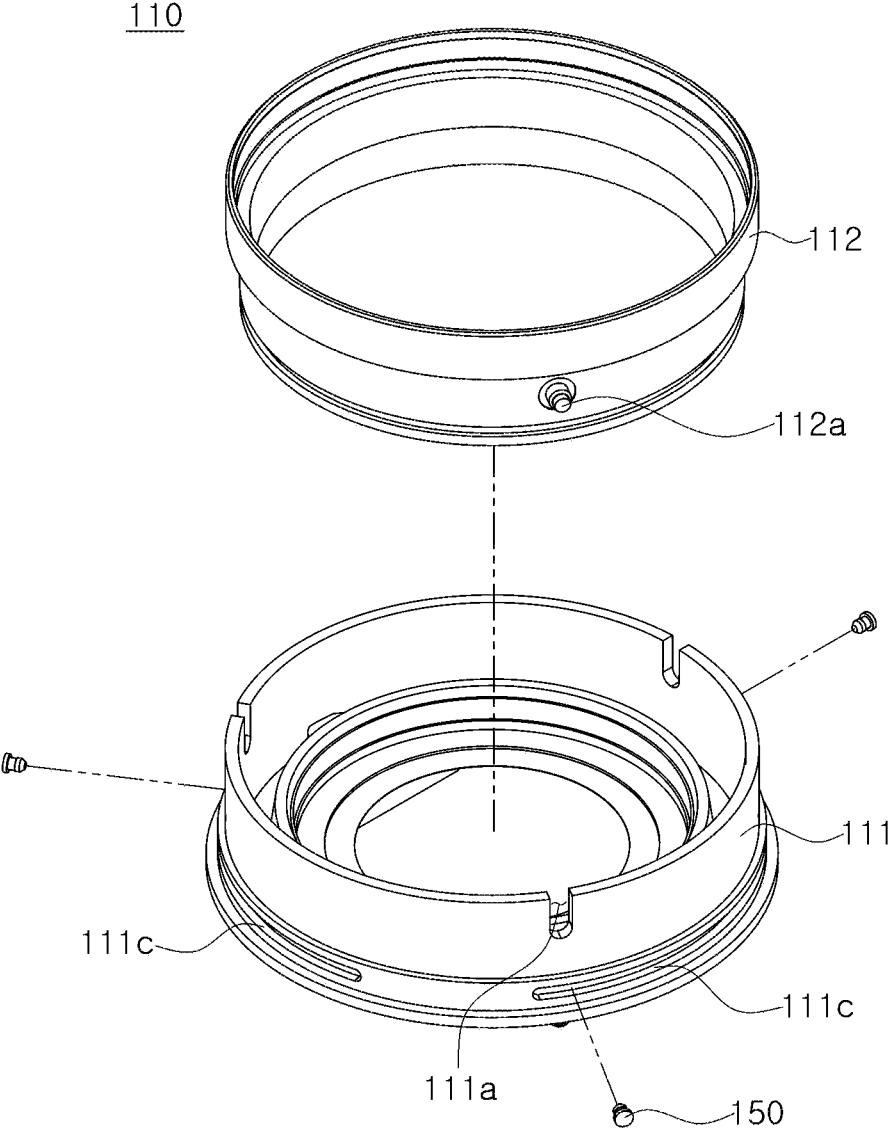
FIG. 6 illustrates an exploded perspective view of an example lens barrel, in accordance with one or more embodiments.
Figure 7:
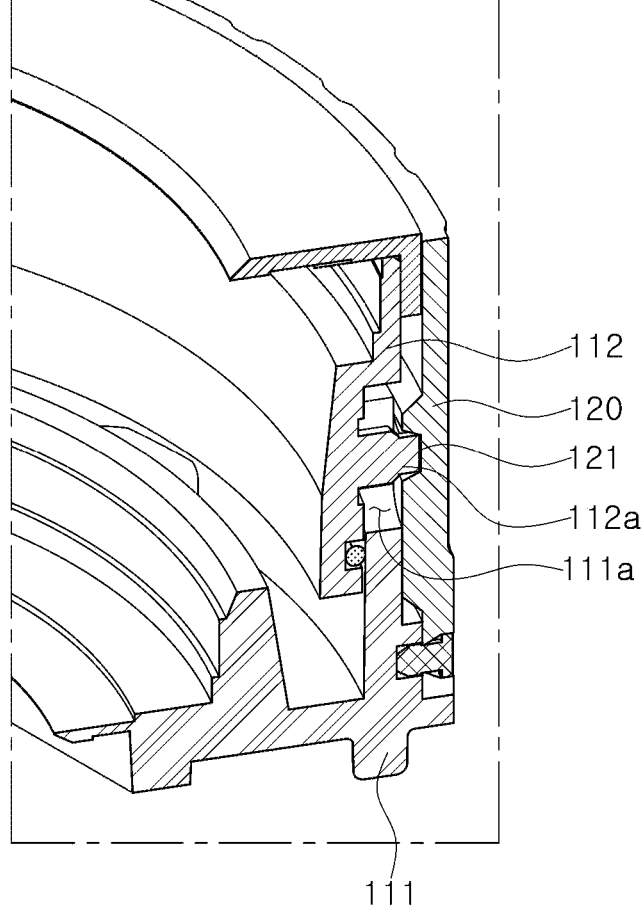
FIG. 7 is a diagram illustrating a coupling relationship between an example lens barrel and a zoom ring, in accordance with one or more embodiments.

FIG. 6 illustrates an exploded perspective view of an example lens barrel, in accordance with one or more embodiments, and FIG. 7 is a view illustrating a coupling relationship between an example lens barrel and a zoom ring, in accordance with one or more embodiments.

Referring to FIG. 3, the coupling protrusion 112a of the movable barrel 112 may be inserted into the diopter groove 121 of the zoom ring 120. The coupling protrusion 112a may remain inserted into the diopter groove 121 during zoom driving operations and non-zoom driving operations. In an example, the coupling protrusions 112a may be inserted into any one of the inclined section 121a and the extension section 121b of the diopter groove 121 during zoom driving operations and non-zoom driving operations.

Accordingly, the fixed barrel 111 may include an avoidance groove 111a. As described above, since the movable barrel 112 may be accommodated inside the fixed barrel 111, and the fixed barrel 111 may be accommodated in the zoom ring 120, the coupling protrusion 112a of the movable barrel 112 may directly face the inner circumferential surface of the zoom ring 120 through the avoidance groove 111a of the fixed barrel 111, and thus may be inserted into the diopter groove 121.

The avoidance grooves 111a may be provided in a number corresponding to the number of coupling protrusions 112a, and the coupling protrusions 112a may be provided in a number corresponding to the number of diopter grooves 121.

The avoidance groove 111a may have a length in the optical axis (the Z-axis) direction and may have a shape with one side open in the optical axis (the Z-axis) direction. In an example, the avoidance groove 111a may have at least a displacement of the movable barrel 112 in the optical axis (Z-axis) direction, that is, a length greater than the distance (|a−b|) between the first position "a" and the second position "b", and an upper side of the avoidance groove 111a may be open in the optical axis (Z-axis) direction.

Zoom driving operations may be performed when the zoom ring 120 rotates in a clockwise direction or a counterclockwise direction. When the zoom ring 120 rotates, the coupling protrusions 112a of the movable barrel 112 may rise or fall within the avoidance groove 111a while being inserted into the inclined section 121a. As the coupling protrusion 112a rises or falls within the avoidance groove 111a, the focal length of the plurality of lenses L may be changed, and the diopter value, which is the reciprocal of the focal length, may also be changed. In an example, the fixed barrel 111 may remain fixed while the zoom ring 120 and the movable barrel 112 move.

Figure 8:
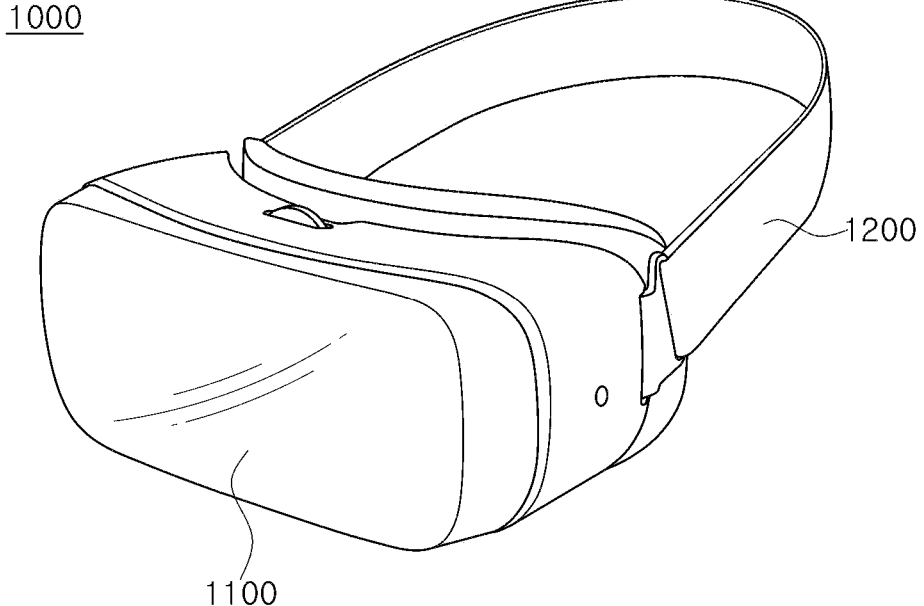
FIG. 8 illustrates a perspective view of an example wearable device, in accordance with one or more embodiments.

FIG. 8 illustrates a perspective view of an example wearable device, in accordance with one or more embodiments.

Referring to FIG. 8, an example wearable device 1000 on which the example lens module 100 is mounted may be, as only an example, a VR head-mounted display device. The wearable device 1000 may include a body portion 1100 and a wearable portion 1200.

In an example in which the wearable device 1000 is worn, the body portion 1100 may be located on the user's eyes, and the wearable portion 1200 may support the wearing of the wearable device 1000 in a manner that surrounds the user's head.

In an example, the body portion 1100 may include the lens module 100 described above. Additionally, in an example, the body portion 1100 may include a display device and a controller. In an example, the wearing portion 1200 may be provided in the form of a band.

In accordance with the one or more examples described above, the diopter position of the lens module 100 may be fixed, thereby improving the reliability of the lens performance test, and the diopter performance of the lens module 100 and the wearable device 1000 including the same may be achieved.

In accordance with the one or more examples, since the diopter position of the lens module may be fixed, the reliability of the lens performance test may be improved, and thus, the diopter performance of the lens module and the wearable device including the lens module may be achieved.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A lens module, comprising:
   a movable barrel configured to accommodate a plurality of lenses;
   a fixed barrel configured to accommodate the movable barrel; and
   a zoom ring configured to accommodate the fixed barrel, and comprising at least one diopter groove on an inner circumferential surface thereof,
   wherein the diopter groove comprises:
      an inclined section that connects two points having different positions in an optical axis direction; and
      respective extension sections which curvedly extend from a first end of the inclined section and a second end of the inclined section,
   wherein the fixed barrel comprises a guide groove on an outer circumferential surface thereof,
   wherein a fixing pin, that mutually couples the zoom ring and the fixed barrel, is inserted into the guide groove, and
   wherein the guide groove is formed to have a length that is shorter than a length of the inclined section.

2. The lens module according to claim 1, wherein:
   the extension sections are formed to have a constant position in the optical axis direction, and comprise:
      a first extension section formed in a first position in the optical axis direction; and
      a second extension section formed in a second position in the optical axis direction, and
      the inclined section connects a first end of the first extension section to a first end of the second extension section.

3. The lens module according to claim 2, wherein the first position is below the second position in the optical axis direction, and the first extension section is formed to have a length that is greater than a length of the second extension section.

4. The lens module according to claim 3, wherein:
   the zoom ring further comprises a vertical section that is formed to have a length in the optical axis direction on an inner circumferential surface thereof, and
   the vertical section is connected to the first extension section.

5. The lens module according to claim 1, wherein:
   the movable barrel comprises a coupling protrusion on an outer circumferential surface thereof,
   the fixed barrel comprises an avoidance groove in a portion corresponding to the coupling protrusion, and
   the coupling protrusion directly faces the inner circumferential surface of the zoom ring through the avoidance groove, and is inserted into the diopter groove.

6. The lens module according to claim 5, wherein the diopter groove is provided in plural, and the coupling protrusion is provided in a number corresponding to the plural diopter grooves.

7. The lens module according to claim 5, wherein the avoidance groove has a length in the optical axis direction, and one side of the avoidance groove is open in the optical axis direction.

8. The lens module according to claim 5, wherein the zoom ring and the movable barrel are configured to move, relative to the fixed barrel, the zoom ring is configured to rotate with respect to the fixed barrel based on the optical axis as a rotation axis, and the movable barrel is configured to move in the optical axis direction with respect to the fixed barrel as the zoom ring rotates.

9. The lens module according to claim 1, further comprising a deco cap that covers a portion of an open upper portion of the movable barrel.

10. The lens module according to claim 1, further comprising an O-ring disposed between the movable barrel and the fixed barrel.

11. An electronic device, comprising the lens module of claim 1.

12. A wearable device, comprising:

a lens module, where the lens module comprises:

a movable barrel configured to accommodate a plurality of lenses;

a fixed barrel configured to accommodate the movable barrel; and a zoom ring configured to accommodate the fixed barrel and comprising at least one diopter groove on an inner circumferential surface thereof, wherein the diopter groove comprises:

an inclined section that connects two points having different positions in an optical axis direction; and respective extension sections which curvedly extend from a first end of the inclined section and a second end of the inclined section, wherein the fixed barrel comprises a guide groove on an outer circumferential surface thereof, wherein a fixing pin, that mutually couples the zoom ring and the fixed barrel, is inserted into the guide groove, and wherein the guide groove is formed to have a length that is shorter than a length of the inclined section.

13. The wearable device according to claim 12, wherein:

the extension sections are formed to have a constant position in the optical axis direction and comprise:

a first extension section formed in a first position in the optical axis direction; and a second extension section formed in a second position in the optical axis direction, and the inclined section connects a first end of the first extension section to a first end of the second extension section.

14. A lens module, comprising:

a lens barrel, comprising a fixed barrel and a movable barrel disposed in the fixed barrel, where the movable barrel is configured to move in an optical axis direction relative to the fixed barrel;

a zoom ring, comprising a plurality of circumferential adjustment grooves, each of the plurality of circumferential adjustment grooves comprising:

a first extension section;

a second extension section, and an inclined section that connects the first extension section and the second extension section, wherein the first extension section is spaced apart from the second extension section by a predetermined distance in the optical axis direction, wherein in a view parallel to the optical axis direction the first extension section and the second extension section extend linearly, wherein the fixed barrel comprises a guide groove on an outer circumferential surface thereof, wherein a fixing pin, that mutually couples the zoom ring and the fixed barrel, is inserted into the guide groove, and wherein the guide groove is formed to have a length that is shorter than a length of the inclined section.

15. The lens module of claim 14, wherein the plurality of adjustment grooves are configured to guide the movable barrel in the optical axis direction.

16. The lens module of claim 15, wherein the movable barrel is configured to move between the first extension section and the second extension section.

17. An electronic device, comprising the lens module of claim 14.

* * * * *